US012164000B2

(12) United States Patent
Cannone et al.

(10) Patent No.: US 12,164,000 B2
(45) Date of Patent: Dec. 10, 2024

(54) ON-CHIP CHECKER FOR ON-CHIP SAFETY AREA

(71) Applicant: STMicroelectronics S.r.l., Agrate Brianza (IT)

(72) Inventors: Alessandro Cannone, Marsala (IT); Enrico Ferrara, Milan (IT); Nicola Errico, Milan (IT); Gea Donzelli, Varese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 636 days.

(21) Appl. No.: 17/460,657

(22) Filed: Aug. 30, 2021

(65) Prior Publication Data
US 2023/0064438 A1 Mar. 2, 2023

(51) Int. Cl.
*G01R 31/3167* (2006.01)
*G01R 31/28* (2006.01)
*G01R 31/317* (2006.01)

(52) U.S. Cl.
CPC ..... *G01R 31/3167* (2013.01); *G01R 31/2884* (2013.01); *G01R 31/31703* (2013.01)

(58) Field of Classification Search
CPC ............ G01R 31/3167; G01R 31/2884; G01R 31/31703; G01R 31/006; G06F 2117/02; G06F 2117/06; G06F 2119/02
USPC .......................................................... 361/78
See application file for complete search history.

(56) References Cited

U.S. PATENT DOCUMENTS

| 2012/0206282 A1* | 8/2012 | Gorbold ................... G05B 9/03 341/120 |
| 2015/0331040 A1* | 11/2015 | Bernon-Enjalbert ........................ H01L 21/76224 438/424 |
| 2018/0059180 A1* | 3/2018 | Rangachari ...... G01R 31/31901 |
| 2020/0052706 A1 | 2/2020 | Cho |

FOREIGN PATENT DOCUMENTS

WO 2020184281 A1 9/2020

OTHER PUBLICATIONS

EP Search Report for counterpart application, EP 22189096.5, report dated Feb. 2, 2023, 5 pgs.

* cited by examiner

*Primary Examiner* — Thienvu V Tran
*Assistant Examiner* — Sreeya Sreevatsa
(74) *Attorney, Agent, or Firm* — Crowe & Dunlevy LLC

(57) ABSTRACT

Disclosed herein is a single integrated circuit chip including main logic that operates a vehicle component such as a valve driver. Isolated from the main logic within the chip is a safety area that operates to verify proper operation of the main logic. A checker circuit within the chip outside of the safety area serves to verify proper operation of the checker circuit. The checker circuit receives signals from the safety circuit and uses combinatorial logic circuit to verify from those signals that the check circuit is operating properly.

13 Claims, 4 Drawing Sheets

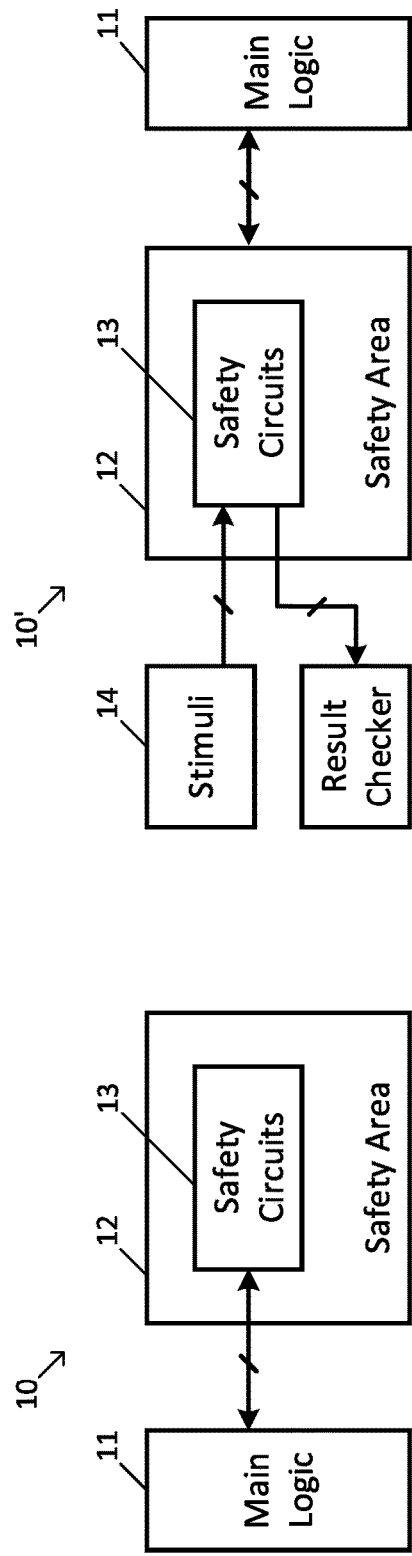
FIG. 1A (Prior Art)
FIG. 1B (Prior Art)
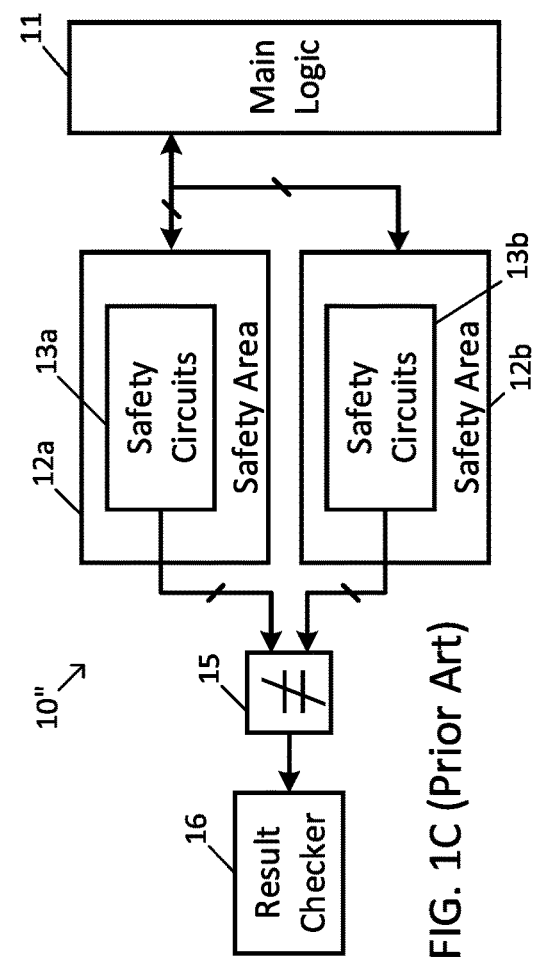
FIG. 1C (Prior Art)

ON-CHIP CHECKER FOR ON-CHIP SAFETY AREA

TECHNICAL FIELD

This disclosure is related to the field of test circuitry and, in particular, to test circuitry for testing the proper operation of circuits within dedicated "safety areas" within integrated circuit chips.

BACKGROUND

Modern vehicles increasingly are equipped with a variety of safety systems, particularly in view of the fact that such modern vehicles increasingly utilize drive-by-wire controls to receive driver input. For example, instead of a vehicle's steering wheel, brake pedal, and gas pedal being mechanically connected to a hydraulic or cable system for controlling the vehicle, one or more of such controls may be connected to a sensing apparatus that communicates the driver's intent to a controller, which in turn effectuates the driver's intent, potentially with modifications for safety.

For example, when a driver presses on the gas pedal to request that rotational torque be applied to the drive wheels of the vehicle, instead of the gas pedal operating a cable that mechanically operates components of the vehicle's engine (e.g., throttle blade), the gas pedal may cooperate with a sensor apparatus to generate an electrical output that is ultimately provided to a transmission controller and a throttle blade controller. The transmission controller, for example, in turn controls the vehicle's transmission, for example by actuating valve drivers that control shifting of the gears of the transmission. Since this transmission controller is actually in control of the transmission rather than the driver, it is desired for fault detection to be performed to determine whether the controller is operating properly.

As a consequence for this desire for safety in the view of drive-by-wire vehicle controls, the ISO 26262 standard was developed to include the Automotive Safety Integrity Level (ASIL) risk classification scheme. The ASIL levels range from ASIL-A (lowest) to ASIL-D (highest). An ASIL level is determined by three factors, namely the severity of a failure, the probability of a failure occurring, and the ability for the effect of the failure to be controlled.

For vehicle components that directly control the movement of the vehicle, such as the transmission and braking systems, ASIL-D applies, and not only are faults to be meticulously detected but the circuits and components used to check for those faults are also to be checked and verified for proper operation.

One of the most common requirements under ASIL-D for transmission controllers is to guarantee a safe switch-off of a power stage, such as may include failsafe pre-drivers and valve drivers. The switch-off is to be guaranteed even in case the common switch-off path, usually implemented via an interaction between logic core and analog driver blocks in the power stage, is not working due to a fault. For this reason, a redundant switch-off path and redundant switch-off circuitry is generally implemented. This redundant switch-off path is generally integrated within a protected area isolated through a deep trench isolation. This protected area is commonly known as a "Safety Area".

One such arrangement may be seen in FIG. 1A. Here, a vehicle system 10 includes a main logic 11, such as a transmission controller, in communication with safety circuits 13 inside a safety area 12. The safety circuits 13 determine whether the main logic 11 is operating correctly and provide for an alternative switch-off path in the event of a detected failure.

As stated, it may be desired for the safety circuits 13 themselves to be checked for proper operation. One such arrangement is shown in the vehicle system 10' of FIG. 1B. Here, a stimuli circuit 14 generates known inputs to be provided to the safety circuit 13, and a result checker 16 verifies whether the safety circuits 13 have generated expected results in response to the stimuli provided by the stimuli circuit 14 to the safety circuits 13. If the safety circuits 13 have not generated the expected results, then it can be assumed that the safety circuits 13 are malfunctioning, and the main logic 11 can take action to help ensure the safety of the vehicle. The issue with this arrangement though is that the stimuli circuit 14 may be complex and consume an excess amount of area, both of which may be undesirable in terms of design.

Another arrangement for checking the safety circuits 13 is shown in FIG. 1C. Here, the safety circuit is replicated, and therefore there are two safety areas 12a, 12b each with its own safety circuit 13a, 13b. The safety circuits 13a, 13b each receive the same inputs from the main logic 11. A digital comparison circuit 15 compares the outputs of the safety circuits 13a, 13b to one another, and provides the output of those comparisons to the result checker 16. If the outputs of the safety circuits 13a, 13b are identical, then it can be assumed that the safety circuits 13a, 13b are operating properly. If the outputs of the safety circuits 13a, 13b are not identical, then it can be assumed that one or both of the safety circuits 13a, 13b is not operating properly. The issue with this arrangement is that the safety area and safety circuit are replicated, and therefore with this arrangement as well, an undesirable amount of area is consumed.

As such, further development is needed.

SUMMARY

Disclosed herein is an integrated circuit chip including: an integrated circuit substrate; main logic within the integrated circuit substrate, the main logic configured to control at least one external component, the main logic further configured to generate at least one digital signal from which proper operation of the main logic can be determined, at least one analog signal from which proper operation of the main logic can be determined, and at least one other signal; and a safety area within the integrated circuit substrate and isolated from the main logic.

The safety area is configured to: generate, from the at least one analog signal, at least one fault signal indicating whether improper operation of the main logic has occurred; generate, from the at least one digital signal, at least one digital fault signal indicating whether improper operation of the main logic has occurred; and generate, based upon the at least one fault signal, the at least one digital fault signal, and the at least one other signal, an output signal that causes the at least one external component to perform a desired function in response to improper operation of the main logic, and a feedback signal that indicates that improper operation of the main logic has not occurred.

A safety area checker circuit is within the integrated circuit substrate and located outside the safety area. The safety area checker circuit includes: a first logic receiving as input the at least one fault signal and the at least one digital fault signal, the first logic generating a first logic output indicative of whether the at least one fault signal or the at least one digital fault signal indicates that improper operation of the main logic has occurred; a second logic receiving as input the first logic output and the at least one other signal, the second logic generating a second logic output; a first comparison circuit receiving as input the second logic output and either the output signal or the feedback signal, the first comparison circuit asserting a first check signal in response to a lack of match in logic levels among inputs to the first comparison circuit; a second comparison circuit receiving as input the first logic output and either the output signal or the feedback signal, the second comparison circuit asserting a second check signal in response to a lack of match in logic levels among inputs to the second comparison circuit; and an OR circuit receiving the first and second check signals as input and generating an error check signal in response to either of the first and second check signals being asserted.

The safety area may be isolated by at least one deep trench isolation.

The safety area may be isolated by at two concentric deep trench isolations.

The safety area checker circuit may also include synchronization circuits through which the at least one fault signal is passed prior to coupling to the first logic.

The first logic may include an AND gate.

A filter may be configured to filter the error check signal.

Also disclosed herein is an integrated circuit chip including: an integrated circuit substrate; main logic within the integrated circuit substrate, the main logic configured to control at least one external component, the main logic further configured to generate a plurality of signals from which proper operation of the main logic can be determined, and to generate at least one other signal; and a plurality of safety areas within the integrated circuit substrate and isolated from the main logic.

Each safety area may be configured to: generate, from some of the plurality of signals, a plurality of fault signals indicating whether improper operation of the main logic has occurred; and generate, based on the plurality of fault signals and the at least one other signal, an output signal that causes the at least one external component to perform a desired function in response to improper operation of the main logic, and a feedback signal that indicates that improper operation of the main logic has not occurred.

A plurality of safety area checker circuits are within the integrated circuit substrate and located outside the safety area, each safety area checker circuit being associated with one of the plurality of safety areas including: a first logic receiving as input the plurality of fault signals, the first logic generating a first logic output indicative of whether the plurality of fault signals indicate that improper operation of the main logic has occurred; a second logic receiving as input the first logic output and the at least one other signal, the second logic generating a second logic output; a first comparison circuit receiving as input the second logic output and either the output signal or the feedback signal, the first comparison circuit asserting a first check signal in response to a lack of match in logic levels among inputs to the first comparison circuit; a second comparison circuit receiving as input the first logic output and either the output signal or the feedback signal, the second comparison circuit asserting a second check signal in response to a lack of match in logic levels among inputs to the second comparison circuit; and an OR circuit receiving the first and second check signals as input and generating an error check signal in response to either of the first and second check signals being asserted;

A first main OR circuit receives the error check signal from each of the plurality of safety area checker circuits as input, and generates an intermediate error check signal based thereupon. A second main OR circuit receives as input the intermediate error check signal and a final error check output. A flip flop receives as input output from the second main OR circuit and generates as output the final error check output.

There may be a filter through which the intermediate error check signal is passed before being coupled to the second main OR circuit.

Each safety area may be isolated by at least one deep trench isolation.

Each safety area may be isolated by at two concentric deep trench isolations.

Each safety area checker circuit may also include synchronization circuits through which some of the plurality of fault signals are passed prior to coupling to the first logic.

The first logic may include an AND gate.

A filter may be configured to filter the error check signal.

BRIEF DESCRIPTION OF THE DRAWINGS

FIG. 1A is a block diagram of a first vehicle system including a safety area that provides an alternative off-path for vehicle circuits within a main logic circuit.

FIG. 1B is a block diagram of a second vehicle system that enables checking of the safety circuits themselves using a stimuli generating circuit and a result checker.

FIG. 1C is a block diagram of a third vehicle system that enables checking of the safety circuits themselves by replicating the safety area and safety circuits and comparing the outputs of those safety circuits to see whether they are identical.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 2:
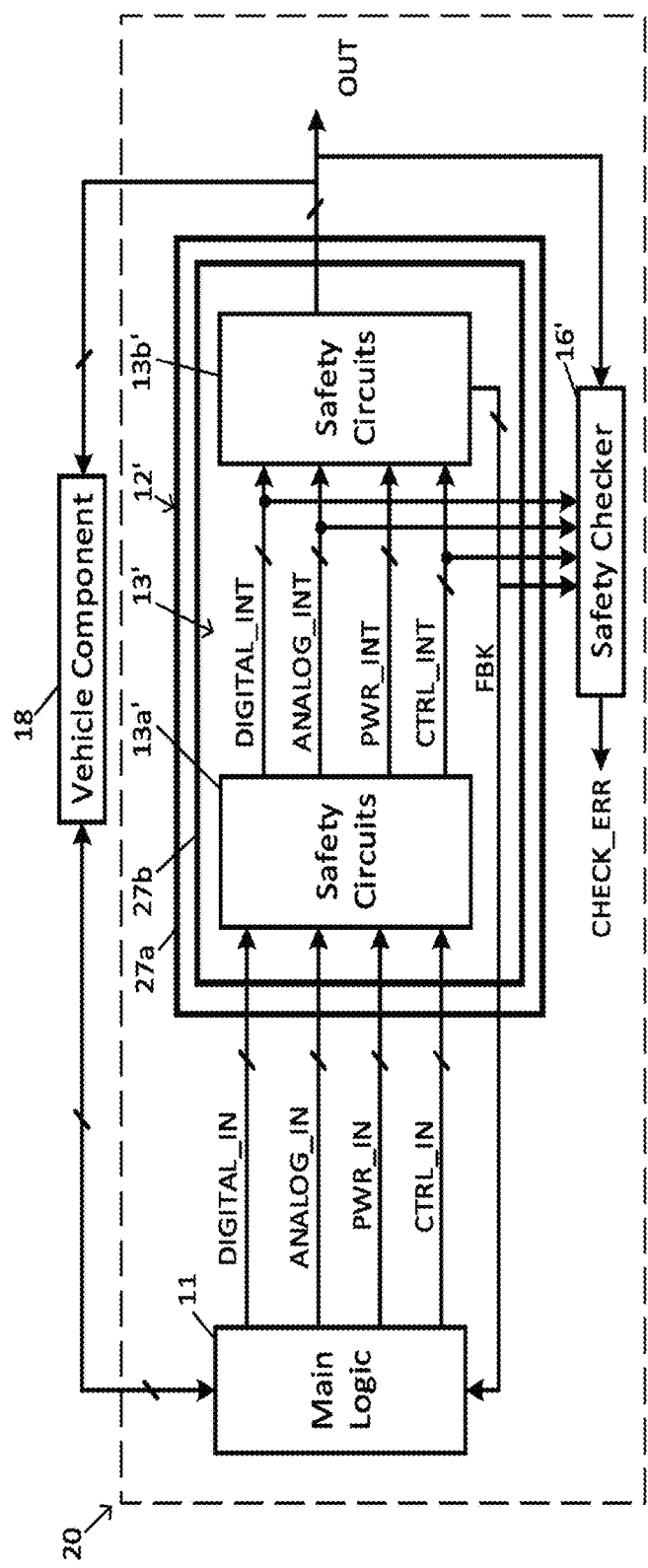
FIG. 2 is a block diagram of a safety area described herein for use in providing an alternative off-path for vehicle circuits within a main logic circuit.
Figure 3:
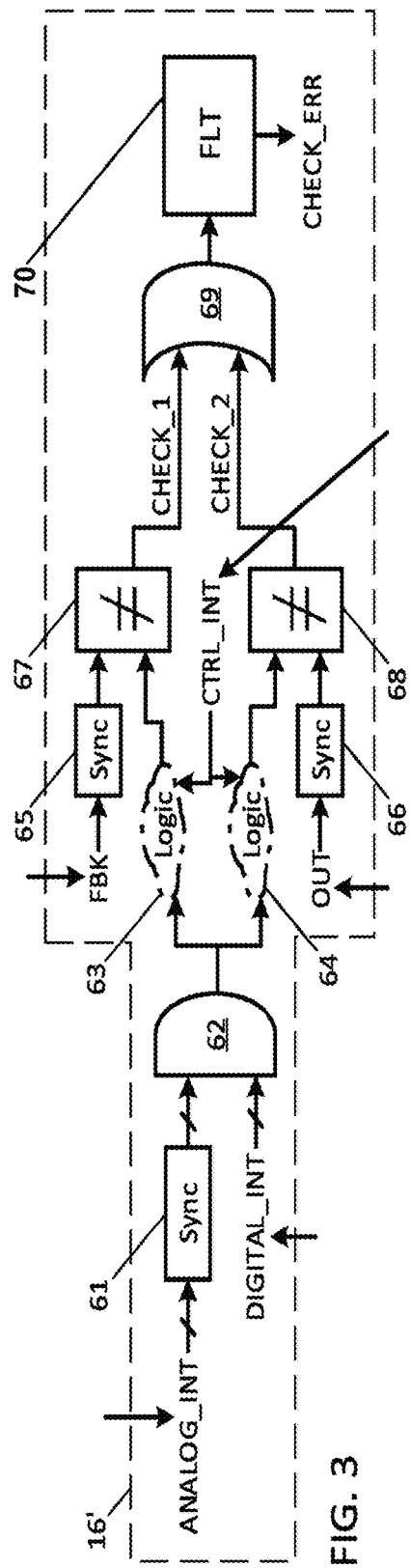
FIG. 3 is a block diagram of a checker circuit for checking for proper operation of the safety area of FIG. 2.

Now described herein with reference to both FIG. 2 and FIG. 3 is a vehicle system including a main logic 11, a safety area 12', and a safety checker 16' located within a single integrated circuit chip 20. The safety checker 16' receives its inputs from the safety area 12' and is for determining that the safety area 12' is operating properly based upon those inputs. The output of the safety checker 16', labelled as CHECK_ERR, indicates whether the safety area 12' is operating properly. A vehicle component 18, such as a transmission component, is external to the single integrated circuit chip 20.

The safety area 12' is located within an area of a silicon substrate surrounded on all sides by two concentric deep trench isolations 27a and 27b, with safety circuits 13' being located within the area enclosed by the deep trench isolation 27b, and with the deep trench isolation 27a surrounding the deep trench isolation 27b.

The safety circuits 13' are located within the safety area 12' so that signals traveling within the safety circuits 13' are protected from shorts to ground and shorts to the vehicle's battery voltage. Thus, the nested deep trench isolations 27a and 27b prevent external faults from propagating inside the safety area 12' to affect the safety circuits 13'.

The safety checker 16' may be used with any safety area containing any safety circuits 13'. Therefore, first a general case is described to show the scope of this disclosure, and then a specific example will be given.

The safety circuits 13' include, for example, a cascade stage 13a' and an elaborating stage 13b'. The cascade stage 13a' receives input from outside the safety area 12'. The elaborating stage 13b' receives input from the cascade stage 13a' and may also receive input from outside the safety area 12'. The elaborating stage 13b' may output one or more feedback signals FBK to the main logic 11 indicating whether or not an error with the operation of the main logic 11 has been detected. If a feedback signal FBK indicates that an error has been detected, the main logic 11 may take action, for example, by resetting or turning off the vehicle component 18 or a sub-component within the vehicle component 18, such as a valve driver.

The cascade stage 13a' receives one or more signals from outside the safety area 12' as input. The input signals may include one or more digital signals DIGITAL_IN, one or more analog signals ANALOG_IN, one or power signals PWR_IN, and one or more control signals CTRL_IN. The cascade stage 13a' processes the input signals to produce the intermediate signals. The intermediate signals include one or more digital signals DIGITAL_INT, one or more digital representations of analog signals ANALOG_INT, one or more power signals PWR_INT, and one or more control signals CTRL_INT. The analog signals ANALOG_IN may have high voltages, for example on the order of 40V, and the cascade stage 13a' converts the analog signals ANALOG_IN to diagnostic digital signals prior to evaluation thereof, for example using comparators to convert the analog signals ANALOG_IN to the diagnostical digital signals ANALOG_INT. The analog signals ANALOG_IN may be passed through a resistor divider and/or cascode prior to being input to the safety area 12'.

The cascade stage 13a' may, for example, assert certain ones of the intermediate signals (to either an active high level or an active low level) when the input signals indicate an error has occurred within the main logic 11. For example, the safety circuits 13a' may assert one or more of the digital representations of the analog input signals ANALOG_INT if the corresponding analog input signal ANALOG_IN indicates a fault has occurred within the main logic 11, and the elaborating stage 13b' may assert one or more of the digital input signals DIGITAL_INT if the corresponding digital input signal DIGITAL_IN indicates a fault has occurred within the main logic 11.

The elaborating stage 13b' receives the intermediate signals, and generate therefrom the feedback signal FBK to the main logic 11, as well as generate therefrom outputs OUT to the vehicle component 18 that may, for example, directly reset or turn off the vehicle component 18 or a sub-component therein in response to detection of fault within the main logic 11.

As explained, the safety checker 16' verifies proper operation of the safety circuits 13'. The safety checker 16' includes an input AND gate 62 that performs a logical AND operation on those of the intermediate signals DIGITAL_INT and ANALOG_INT asserted (or not) by the cascade stage 13a' when a fault within the main logic 11 is detected. Note that the digital representations of the analog intermediate signals ANALOG_INT are passed through synchronizers 61 (e.g., each being a pair of daisy chained flip flops) before being input to the AND gate 62. Also note that, although not shown, any of the digital representations of the analog intermediate signals ANALOG_INT or digital intermediate signals DIGITAL_INT that are active low are passed through an inverter prior to being input to the AND gate 62.

Optional combinatorial logic circuits 63 and 64 may receive the internal control signals CTRL_INT, may perform combinatorial logic on the output of the AND gate 62 and the internal control signals CTRL_INT, and may provide that output to comparison circuits 67 and 68; where one or both of the combinatorial logic circuits 63 and 64 are not present, the output of the AND gate 62 is provided directly to the associated comparison circuit 67 or 68.

In some instances, the input AND gate 62 may receive one or more of the digital representations of the analog input signals ANALOG_IN or digital input signals DIGITAL_IN. Also, in some instances, one or both of the logic circuits 63 and 64 may additionally or alternatively receive one or more of the control signals CTRL as input.

The comparison circuit 67 receives as input the feedback signal FBK, after synchronization by synchronization circuit 65, as well as the output of the combinatorial logic circuit 63 (or the output of the AND gate 62); if the signals do not have the same logic state, then the comparison circuit 67 asserts the check signal CHECK_1. The comparison circuit 68 receives as input the output signal OUT, after synchronization by synchronization circuit 66, as well as the output of the combinatorial logic circuit 63 (or the output of the AND gate 62); if the signals do not have the same logic state, then the comparison circuit 68 asserts the check signal CHECK_2.

A logic OR gate 69 performs a logical OR operation on the check signal CHECK_1 and check signal CHECK_2 and provides the result to a filter 70 to thereby produce an error check signal CHECK_ERR. If the error check signal CHECK_ERR is asserted, this means that a fault in the safety circuits 13' has been detected, and action may be taken by the main logic 11 accordingly.

Figure 4:
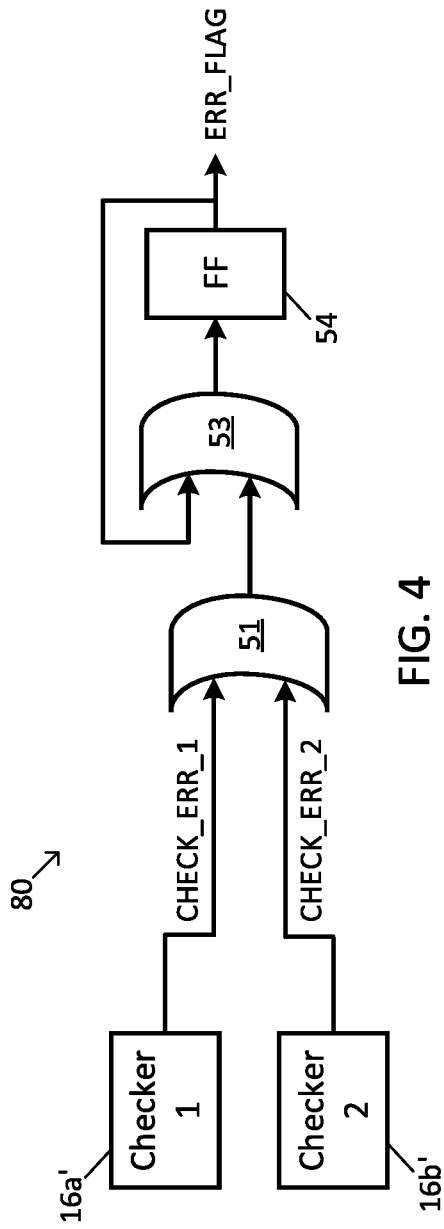
FIG. 4 is a block diagram of a checker system that utilizes multiple checker circuits, such as that of FIG. 3, to provide for additional error detection of multiple different safety areas.

As shown in FIG. 4, multiple such safety checkers 16a' and 16b' may be employed within a single integrated circuit chip for extra redundancy, or different such safety checkers 16a' and 16b' within a single integrated circuit chip may be employed to check different safety areas 12' within the single integrated circuit chip. Either way, a multiple checker arrangement 80 is shown in FIG. 4, where it can be seen that the outputs CHECK_ERR_1 and CHECK_ERR_2 of safety checkers 16a' and 16b' are passed to an OR gate 51 as input. The output of the OR gate 51 is passed to an OR gate 53 as input, which also receives the output error flag ERR_FLAG as input. The output of the OR gate 53 is passed to the flip flop 54 as input, which produces the output error flag ERR_FLAG as output. Through the use of this multiple checker arrangement 80, a single error flag ERR_FLAG can be used to indicate whether a fault has occurred within one or more safety areas 12'.

Figure 5:
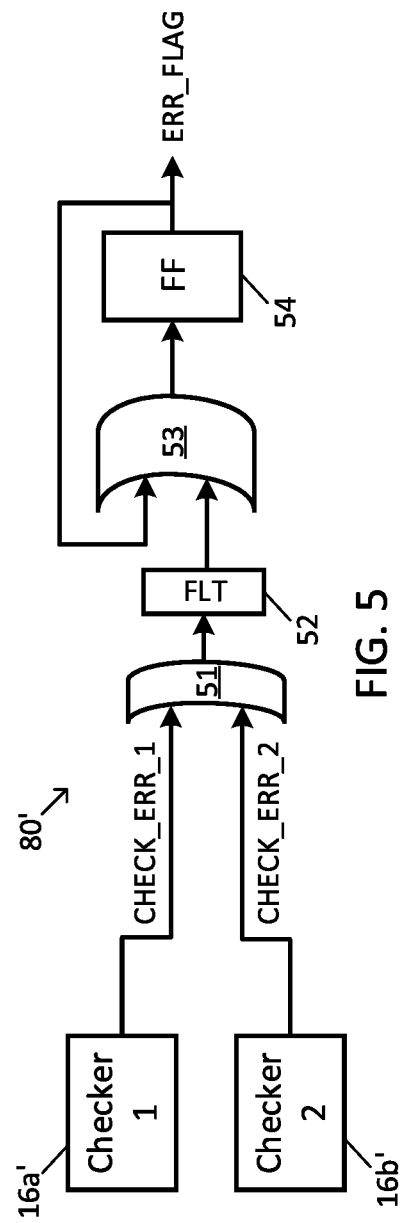
FIG. 5 is a block diagram of a variant of the checker system of FIG. 4.

A similar arrangement is shown in FIG. 5, but there it can be observed that the output of the OR gate 51 is filtered by a filter (FLT) 52 before being passed to the OR gate 53 as input. The filters 70 may be removed from the safety checkers 16a' and 16b' due to the presence of the filter 52.

The benefits provided by the safety checker 16' are manifest. For example, the safety checker 16' provides for full checking of the safety circuits 13', without the need for a replica safety area 12', and without the need for a stimuli generating circuit that generates known inputs to the safety circuits 13' so that the outputs may be checked for known outputs, thereby reducing complexity and reducing area consumption within the chip 20. Instead, as explained, the safety checker 16' contains circuits configured to, given certain same inputs as the safety circuits 13', produce an identical output to the safety circuits 13' if the safety circuits 13' are operating properly.

Also due the design, the safety checker 16' can run continuously on the fly, yielding near immediate fault detection. Moreover, the safety checker 16' can be included with a logic built in self test (BIST) to verify proper operation of the safety circuits 13' at startup of the chip 20. Moreover, the safety checker 16' itself can be designed for test such that it may be tested by automated test equipment (ATE) during back end manufacturing processes using scan techniques, or may be tested by automated test pattern generation (ATPG) techniques. Also, the safety checker 16' allows the ATE to test the safety area 12' without the need for the ATE to apply signals to the safety area 12'— once the ATE has verified that the safety checker 16' is operating properly, the safety checker 16' can then be used to test the safety area 12'.

Figure 6:
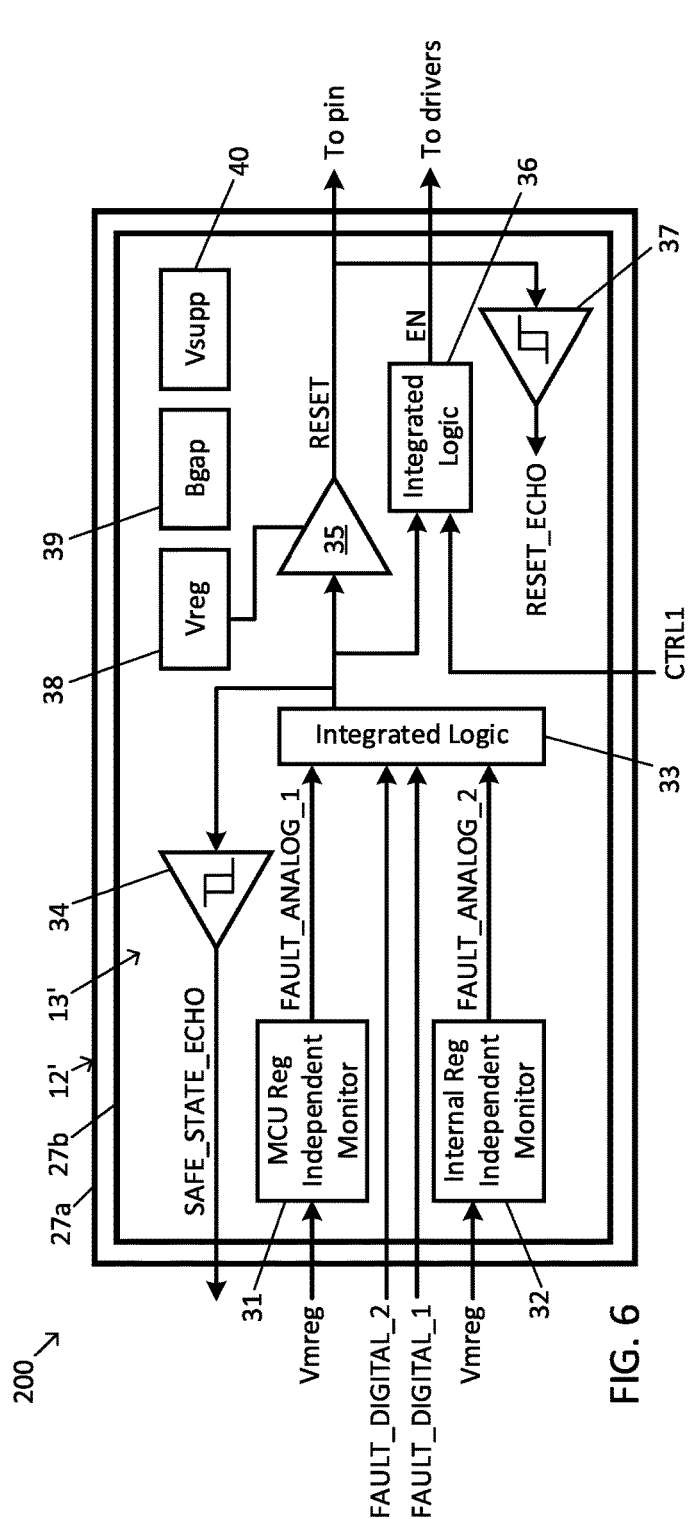
FIG. 6 is a block diagram of a safety area described herein for use in providing an alternative off-path for vehicle circuits within a main logic circuit.
Figure 7:
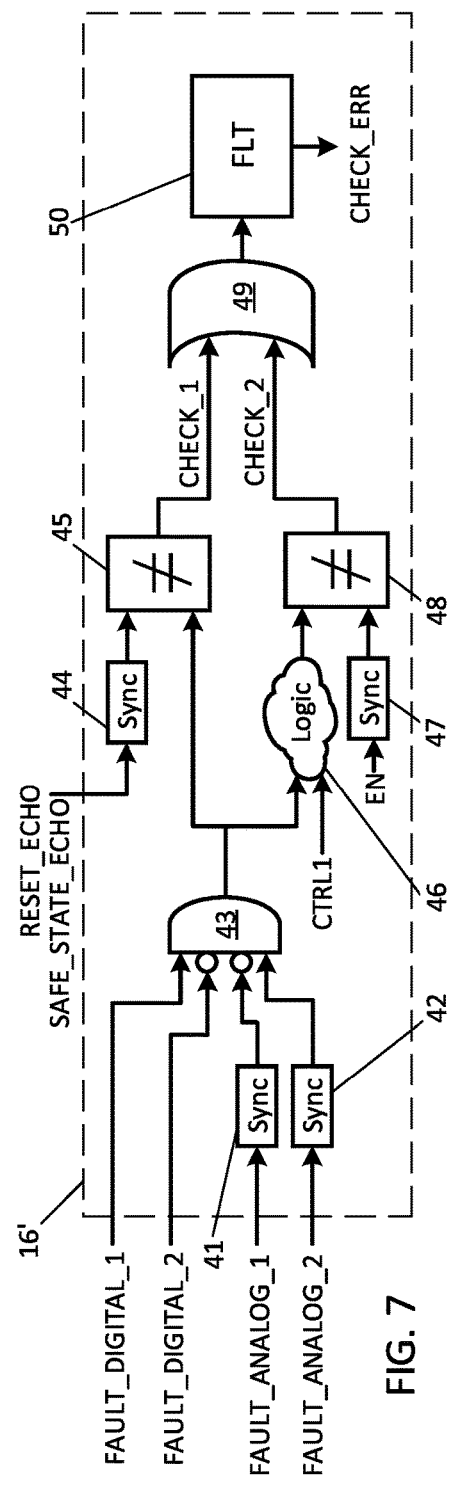
FIG. 7 is a block diagram of a checker circuit for the safety area of FIG. 6.

A specific example of a safety area 12' and safety checker 16' are now described with reference to both FIG. 6 and FIG. 7, merely for exemplary purposes, and this disclosure is in no way intended to be limited to such specific embodiments.

The safety circuits are located within the safety area 12' so that signals traveling within the safety circuits 13' are protected from shorts to ground and shorts to the vehicle's battery voltage. Thus, the nested deep trench isolations 27a and 27b prevent external faults from propagating inside the safety area 12' to affect the safety circuits 13'.

The safety circuits 13' include an internal isolated voltage supply 40 generating an internal supply voltage Vsupp (for example, 3.3 V), an independent bandgap voltage generator 39 generating a bandgap voltage Bgap used for internal monitors within the safety area 12', and a voltage regulator 38 generating a regulated voltage Vreg (for example, 5 V).

An internal integrated logic circuit 33 receives externally generated digital fault signals, FAULT_DIGITAL_1 and FAULT_DIGITAL_2, from which it can be determined whether certain faults within the single integrated circuit chip 20 outside of the safety area 12' have occurred. The first digital fault signal FAULT_DIGITAL_1 may be a watchdog signal from the main logic, assertion of which may be indicative of a fault. The second digital fault signal FAULT_DIGITAL_2 may be an overcurrent detection signal from the main logic, de-assertion of which may be indicative of a fault.

A first internal independent monitoring circuit 31 may be an undervoltage monitor and monitor a main regulated voltage Vmreg from the main logic within the single integrated circuit chip 20, and de-assert a first analog fault signal FAULT_ANALOG_1 if the main regulated voltage Vmreg is under its expected value. A second internal independent monitoring circuit 32 may be an overvoltage monitor and monitor the main regulated voltage Vmreg from the main logic within the single integrated circuit chip 20, and assert a second analog fault signal FAULT_ANALOG_2 if the main regulated voltage Vmreg is over its expected value. The internal integrated logic circuit 33 receives the first analog fault signal FAULT_ANALOG_1 and the second analog fault signal FAULT_ANALOG_2.

The internal integrated logic circuit 33 generates an output signal to a Schmitt trigger 34, which generates a safe state echo signal SAFE STATE ECHO therefrom, which may serve to inform the main logic when the safety circuits 13' have detected a fault with the main logic.

Output of the internal integrated logic circuit 33 is also applied to a buffer 35, which generates a reset signal RESET for usage to reset appropriate external circuits (external to the single integrated circuit chip 20) when the safety circuits 13' have detected a fault with the main logic. A Schmitt trigger 37 generates an echo of the reset signal RESET, labelled as RESET ECHO, which may be provided to the main logic to inform the main logic when a fault therein has occurred.

Output of the internal integrated logic circuit 33 is also provided to an integrated logic circuit 36, which also receives an external control signal CTRL1 as input, and from it generates an enable signal EN for vehicular components external to the single integrated circuit chip 20, such as valve drivers within the transmission. Thus, when a fault is detected, the enable signal EN is deasserted, so that the valve drivers cease to function.

The safety checker 16' is now described. The safety checker 16' includes synchronization circuits 41 and 42 that respectively synchronize the analog fault signals FAULT_ANALOG_1 and FAULT_ANALOG_2, and provides the synchronized version of those signals to an AND gate 43. The AND gate 43 also received the digital fault signals FAULT_DIGITAL_1 and FAULT_DIGITAL_2. Since the digital fault signal FAULT_DIGITAL_2 and analog fault signal FAULT_ANALOG_1 are active low signals, they are input to the AND gate 43 through inverters (shown as bubbles on those inputs of the AND gate 43).

The reset echo signal RESET ECHO and/or safe sate echo signal SAFE STATE ECHO are synchronized by a synchronization circuit 44, and provided to comparison circuitry 45. The output of the AND gate 43 is also provided to the comparison circuitry 45. If the logic level of the output of the AND gate 43 matches the logic level of the output of the synchronization circuit 44, a first check signal CHECK_1 is asserted.

A logic circuit 46 receives the control signal CTRL1 and the output of the AND gate 43, performs a combinational logic function thereon, and provides the output thereof to comparison circuitry 48. The enable signal EN is passed through a synchronization circuit 47 to the comparison circuitry 48. The comparison circuitry 48 compares the logic level of the enable signal EN to the logic level of the output of the logic circuit 46. If the logic level of the output of the logic circuit 46 matches the logic level of the enable signal EN, a second check signal CHECK_2 is asserted.

An OR gate 49 performs a logical OR operation on the logic level of the first check signal CHECK_1 and the logic level of the second check signal CHECK_2, and asserts its output if either the first check signal CHECK_1 or the second check signal CHECK_2 is asserted. The output of the OR gate 49 is filtered by a filter 50 to produce an error signal CHECK_ERR. If the error signal CHECK_ERR is asserted, the safety circuits 13' within the safety area 12' have malfunctioned.

It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An integrated circuit chip, comprising:
   an integrated circuit substrate;
   main circuitry within the integrated circuit substrate, the main circuitry configured to control at least one external component, the main circuitry further configured to generate at least one digital signal from which proper operation of the main circuitry can be determined, at least one analog signal from which proper operation of the main circuitry can be determined, and at least one other signal;
   a safety area within the integrated circuit substrate and isolated from the main circuitry, the safety area configured to:
      generate, from the at least one analog signal, at least one fault signal indicating whether improper operation of the main circuitry has occurred;
      generate, from the at least one digital signal, at least one digital fault signal indicating whether improper operation of the main circuitry has occurred; and
      generate, based upon the at least one fault signal, the at least one digital fault signal, and the at least one other signal, an output signal that causes the at least one external component to perform a desired function in response to improper operation of the main circuitry, and a feedback signal that indicates that improper operation of the main circuitry has not occurred; and
   a safety area checker circuit within the integrated circuit substrate and located outside the safety area, the safety area checker circuit comprising:
      a first logic receiving as input the at least one fault signal and the at least one digital fault signal, the first logic generating a first logic output indicative of whether the at least one fault signal or the at least one digital fault signal indicates that improper operation of the main circuitry has occurred;
      a second logic receiving as input the first logic output and the at least one other signal, the second logic generating a second logic output;
      a first comparison circuit receiving as input the second logic output and either the output signal or the feedback signal, the first comparison circuit asserting a first check signal in response to a lack of match in logic levels among inputs to the first comparison circuit;
      a second comparison circuit receiving as input the first logic output and either the output signal or the feedback signal, the second comparison circuit asserting a second check signal in response to a lack of match in logic levels among inputs to the second comparison circuit; and
      an OR circuit receiving the first and second check signals as input and generating an error check signal in response to either of the first and second check signals being asserted.

2. The integrated circuit chip of claim 1, wherein the safety area is isolated by at least one deep trench isolation.

3. The integrated circuit chip of claim 1, wherein the safety area is isolated by at two concentric deep trench isolations.

4. The integrated circuit chip of claim 1, wherein the safety area checker circuit further comprises synchronization circuits through which the at least one fault signal is passed prior to coupling to the first logic.

5. The integrated circuit chip of claim 1, wherein the first logic comprises an AND gate.

6. The integrated circuit chip of claim 1, further comprising a filter configured to filter the error check signal.

7. An integrated circuit chip, comprising:
   an integrated circuit substrate;
   main circuitry within the integrated circuit substrate, the main circuitry configured to control at least one external component, the main circuitry further configured to generate a plurality of signals from which proper operation of the main circuitry can be determined, and to generate at least one other signal;
   a plurality of safety areas within the integrated circuit substrate and isolated from the main circuitry, each of the plurality of safety areas configured to:
      generate, from some of the plurality of signals, a plurality of fault signals indicating whether improper operation of the main circuitry has occurred; and
      generate, based on the plurality of fault signals and the at least one other signal, an output signal that causes the at least one external component to perform a desired function in response to improper operation of the main circuitry, and a feedback signal that indicates that improper operation of the main circuitry has not occurred;
   a plurality of safety area checker circuits within the integrated circuit substrate and located outside the plurality of safety areas, each of the plurality of safety area checker circuits associated with one of the plurality of safety areas and comprising:
      a first logic receiving as input the plurality of fault signals, the first logic generating a first logic output indicative of whether the plurality of fault signals indicate that improper operation of the main circuitry has occurred;
      a second logic receiving as input the first logic output and the at least one other signal, the second logic generating a second logic output;
      a first comparison circuit receiving as input the second logic output and either the output signal or the feedback signal, the first comparison circuit asserting a first check signal in response to a lack of match in logic levels among inputs to the first comparison circuit;
      a second comparison circuit receiving as input the first logic output and either the output signal or the feedback signal, the second comparison circuit asserting a second check signal in response to a lack of match in logic levels among inputs to the second comparison circuit; and
      an OR circuit receiving the first and second check signals as input and generating an error check signal in response to either of the first and second check signals being asserted;
   a first main OR circuit receiving the error check signal from each of the plurality of safety area checker circuits as input, and generating an intermediate error check signal based thereupon;

a second main OR circuit receiving as input the intermediate error check signal and a final error check output; and a flip flop receiving as input output from the second main OR circuit and generating as output the final error check output.

8. The integrated circuit chip of claim 7, further comprising a filter through which the intermediate error check signal is passed before being coupled to the second main OR circuit.

9. The integrated circuit chip of claim 7, wherein each of the plurality of safety areas is isolated by at least one deep trench isolation.

10. The integrated circuit chip of claim 7, wherein each of the plurality of safety areas is isolated by at least two concentric deep trench isolations.

11. The integrated circuit chip of claim 7, wherein each of the plurality of safety area checker circuits further comprises synchronization circuits through which some of the plurality of fault signals are passed prior to coupling to the first logic.

12. The integrated circuit chip of claim 7, wherein the first logic comprises an AND gate.

13. The integrated circuit chip of claim 7, further comprising a filter configured to filter the error check signal.

* * * * *